United States Patent
Kim et al.

(10) Patent No.: US 10,812,716 B2
(45) Date of Patent: Oct. 20, 2020

(54) CAMERA APPARATUS HAVING OIS FUNCTION AND COMMUNICATIONS METHOD THEREOF

(71) Applicant: Samsung Electro-Mechanics Co., Ltd., Suwon-si (KR)

(72) Inventors: Gyu Won Kim, Suwon-si (KR); Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 133 days.

(21) Appl. No.: 16/174,529

(22) Filed: Oct. 30, 2018

(65) Prior Publication Data

US 2019/0253629 A1    Aug. 15, 2019

(30) Foreign Application Priority Data

Feb. 13, 2018  (KR) .................. 10-2018-0017631

(51) Int. Cl.
*H04N 5/232* (2006.01)
*G06F 1/16* (2006.01)

(52) U.S. Cl.
CPC .............................. *H04N 5/23258* (2013.01)

(58) Field of Classification Search
CPC ............ G02B 27/646; G03B 2217/005; G03B 2205/0007–0038; G06T 7/38; H04N 5/23248–2329
USPC ............... 348/208.14, 208.99; 359/554–557; 396/52–55, 13
See application file for complete search history.

(56) References Cited

U.S. PATENT DOCUMENTS

| | | | | |
|---|---|---|---|---|
| 2006/0165405 A1* | 7/2006 | Kanai | ................ | H04N 5/23203 396/334 |
| 2008/0152332 A1* | 6/2008 | Koo | .................... | H04N 5/23287 396/55 |
| 2014/0280581 A1* | 9/2014 | Hernandez | ............ | G06F 21/335 709/204 |
| 2017/0364303 A1* | 12/2017 | Shih | ...................... | G06F 3/0673 |

FOREIGN PATENT DOCUMENTS

| | | |
|---|---|---|
| GB | 2503961 A | 1/2014 |
| KR | 10-2003-0024250 A | 3/2003 |
| KR | 10-2013-0060756 A | 6/2013 |

* cited by examiner

*Primary Examiner* — Xi Wang
(74) *Attorney, Agent, or Firm* — NSIP Law

(57) ABSTRACT

A camera apparatus includes an optical image stabilizer (OIS) circuit including a control circuit configured to control data reading, and a digital circuit including a serial peripheral interface bus (SPI) master and configured to perform data processing using SPI communications in response to control of the control circuit to perform hand-shake correction. The camera apparatus further includes a navigation sensor including an SPI slave for communication with the SPI master and configured to provide corresponding data in response to a request from the OIS circuit. The control circuit is further configured to control communication using a single mode or a burst mode based on a preset SPI communications setting, and the digital circuit is further configured to read data from the navigation sensor using two frames based on a single SPI communications setting in a case of using the burst mode.

14 Claims, 9 Drawing Sheets

CAMERA APPARATUS HAVING OIS FUNCTION AND COMMUNICATIONS METHOD THEREOF

CROSS-REFERENCE TO RELATED APPLICATIONS

This application claims the benefit under 35 USC 119(a) of Korean Patent Application No. 10-2018-0017631 filed on Feb. 13, 2018, in the Korean Intellectual Property Office, the entire disclosure of which is incorporated herein by reference for all purposes.

BACKGROUND

1. Field

This application relates to a camera apparatus having an optical image stabilizer (OIS) function and a communications method thereof.

2. Description of Related Art

In general, optical image stabilizer (OIS) technology, a technology for preventing a captured image from disadvantageously being blurred due to a user's hand shaking during photography with a hand-held camera has been applied to some camera modules.

OIS systems employing OIS technology may use data from a navigation sensor such as a gyro sensor for a more stable operation.

Conventional OIS systems read data from a navigation sensor such as a gyro sensor using a serial peripheral interface bus (SPI) or an inter-integrated circuit bus (I2C).

In generally, a conventional OIS system is operatively associated with an internal microcontroller unit (MCU) to read data from a navigation sensor such as a gyro sensor. In this case, to read data from the navigation sensor (e.g., a gyro sensor), the MCU needs to access a digital circuit, and the number of times that the MCU accesses the digital circuit influences a data reading speed from a navigation sensor and an MCU internal processing speed.

In a conventional OIS system, a method of reading two different types of data from a gyro sensor may include sequentially performing operations of transmitting a command to a digital circuit via SPI communications to check a status of the gyro sensor by an MCU, reading one type of data from the gyro sensor once, re-transmitting a command to the digital circuit via SPI communications by the MCU to check a status of the gyro sensor, and then reading another type of data from the gyro sensor.

Thus, when such a method of reading two different types of data is used in the conventional OIS, an SPI master of the digital circuit receives a command from the MCU twice, and thus there is a problem that it takes a relatively long time to read data and a data processing speed is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera apparatus includes an optical image stabilizer (OIS) circuit including a control circuit configured to control data reading, and a digital circuit including a serial peripheral interface bus (SPI) master and configured to perform data processing using SPI communications in response to control of the control circuit to perform hand-shake correction; and a navigation sensor including an SPI slave for communication with the SPI master and configured to provide corresponding data in response to a request from the OIS circuit, wherein the control circuit is further configured to control communication using a single mode or a burst mode based on a preset SPI communications setting, and the digital circuit is further configured to read data from the navigation sensor using two frames based on a single SPI communications setting in a case of using the burst mode.

The digital circuit may be further configured to determine a preset mode from a two-frame burst mode and a one-frame burst mode included in the burst mode, and in response to the two-frame burst mode being determined, execute the two-frame burst mode and read data using two frames from the navigation sensor based on the single SPI communications setting.

The single mode may be set to a mode for processing 1-byte data, the burst mode may include a one-frame burst mode and a two-frame burst mode for reading preset 2-byte data, the two-frame burst mode may be configured to use two data frames and include a first burst mode and a second burst mode distinguished according to whether a status is checked, and the one-frame burst mode may be configured to use one data frame and include a third burst mode and a fourth burst mode distinguished according to whether a status is checked.

The control circuit may be further configured to control SRI communications between the digital circuit and the navigation sensor based on the preset SRI communications setting, and the digital circuit may be further configured to perform corresponding data processing on the navigation sensor using any one communications mode of the preset single mode, the first burst mode, the second burst mode, the third burst mode, and the fourth burst mode in response to control of the control circuit.

The control circuit may be further configured to read data using a data frame 1 and a data frame 2 in the first burst mode of the two-frame burst mode without a status check, read data using a status frame for a status check, the data frame 1, and the data frame 2 in the second burst mode of the two-frame burst mode, read data using the data frame 1 in the third burst mode of the one-frame burst mode without a status check, and read data using the status frame for the status check and the data frame 1 in the fourth burst mode of the one-frame burst mode.

The status frame may include a read/write identifying region, an address region, and a data region.

The data frame 1 may include a read identifying region, an address region, and a plurality of data regions for reading gyro data from the navigation sensor.

The data frame 2 may include a read identifying region, an address region, and a plurality of data regions for reading acceleration data from the navigation sensor.

In another general aspect, in a camera apparatus including an optical image stabilizer (OIS) circuit, the OIS circuit including a control circuit and a digital circuit including a serial peripheral interface bus (SRI) master, the camera apparatus further including a navigation sensor including an SRI slave for SRI communications with the SRI master, a communications method of the camera apparatus includes determining whether a communications mode of data to be currently read is a single mode or a burst mode; in response to the determined communications mode being the burst mode, determining the communications mode of the data to be currently read to be a preset two-frame burst mode or a one-frame burst mode; and in response to the determined communications mode being the preset two-frame burst mode, executing the preset two-frame burst mode by the digital circuit to perform SPI communications with the navigation sensor based on a preset SPI communications setting and reading data using two frames from the navigation sensor based on a single SPI communications setting.

The determining of the communications mode of the data to be currently read to be the preset two-frame burst mode or the one-frame burst mode may include determining the communications mode of the data to be currently read to be a first burst mode or a second burst mode included in the preset two-frame burst mode, or a third burst mode or a fourth burst mode included in the one-frame burst mode.

The reading of the data may include reading data using a data frame 1 and a data frame 2 in the first burst mode of the two-frame burst mode without a status check; reading data using a status frame for a status check, the data frame 1, and the data frame 2 in the second burst mode of the two-frame burst mode; reading data using the data frame 1 in the third burst mode of the one-frame burst mode without a status check; and reading data using the status frame for the status check and the data frame 1 in the fourth burst mode of the one-frame burst mode.

The status frame may include a read/write identifying region, an address region, and a data region.

The data frame 1 may include a read identifying region, an address region, and a plurality of data regions for reading gyro data from the navigation sensor.

The data frame 2 may include a read identifying region, an address region, and a plurality of data regions for reading acceleration data from the navigation sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
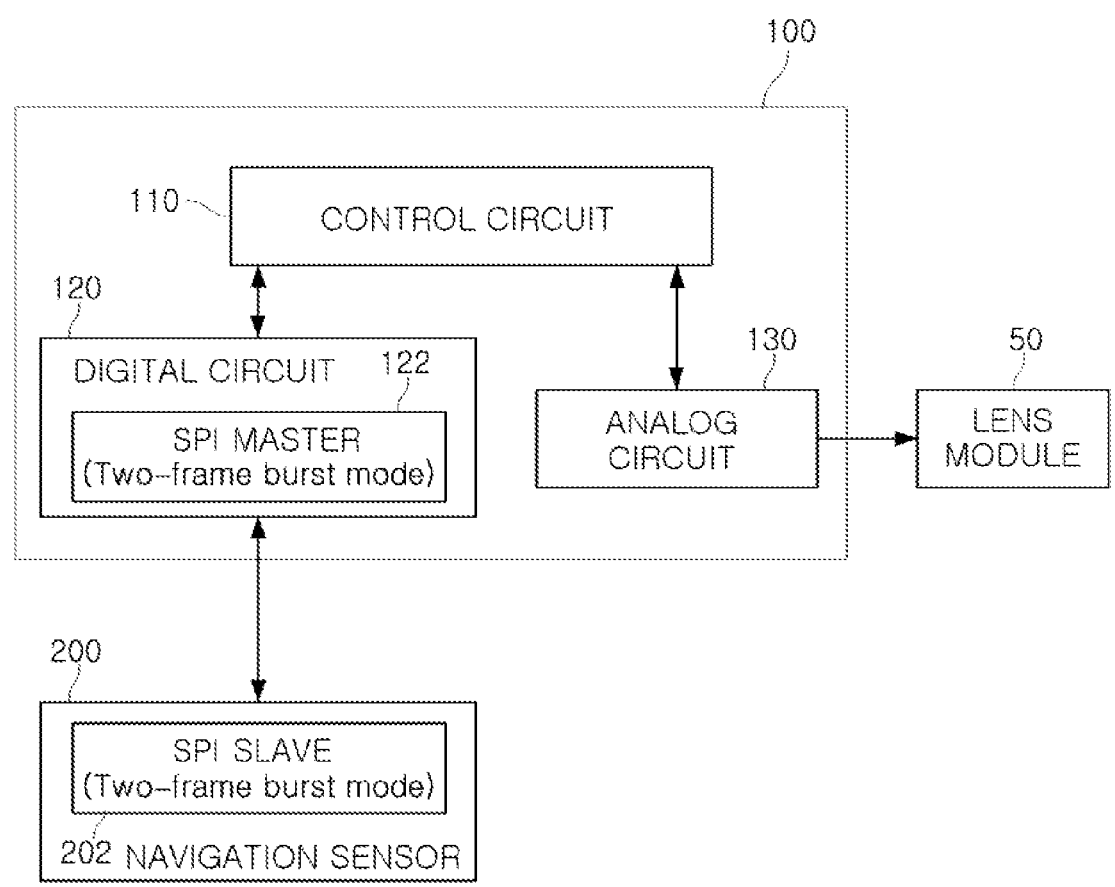
FIG. 1 is block diagram showing an example of a configuration of a camera apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is block diagram showing an example of a configuration of a camera apparatus.

Referring to FIG. 1, a camera apparatus includes an optical image stabilizer (OIS) circuit 100, a navigation sensor 200, and a lens module 50.

The OIS circuit 100 includes a control circuit 110, a digital circuit 120, and an analog circuit 130.

The control circuit 110 controls data processing, for example, data reading and data writing, of the digital circuit 120.

The digital circuit 120 includes a serial peripheral interface bus (SPI) master 122 and performs data processing such as data reading and data writing using SPI communications with the navigation sensor 200 in response to control of the control circuit 110. For example, the navigation sensor 200 includes either one or both of a gyro sensor for measuring angular velocity and an acceleration sensor for measuring acceleration.

The navigation sensor 200 includes an SPI slave 202 that communicates with the SPI master 122 of the digital circuit 120 and provides corresponding data in response to a request from the OIS circuit 100. For example, the data provided by the navigation sensor 200 may be angular velocity data from the gyro sensor or acceleration data from the acceleration sensor.

The control circuit 110 presets an SPI communications setting for each of a single mode and a burst mode to perform SPI communications, determines a communications mode of data to be processed to be the single mode or the burst mode when an event occurs, controls communication using the determined communications mode, and processes communication data.

In one example, the control circuit 110 controls the lens module 50 using data transmitted through SRI communications between the digital circuit 120 and the navigation sensor 200 according to the preset SRI communications setting. In another example, a control signal for control of the lens module 50 is provided to the analog circuit 130 using data from the digital circuit 120 and data from the analog circuit 130.

Figure 3:
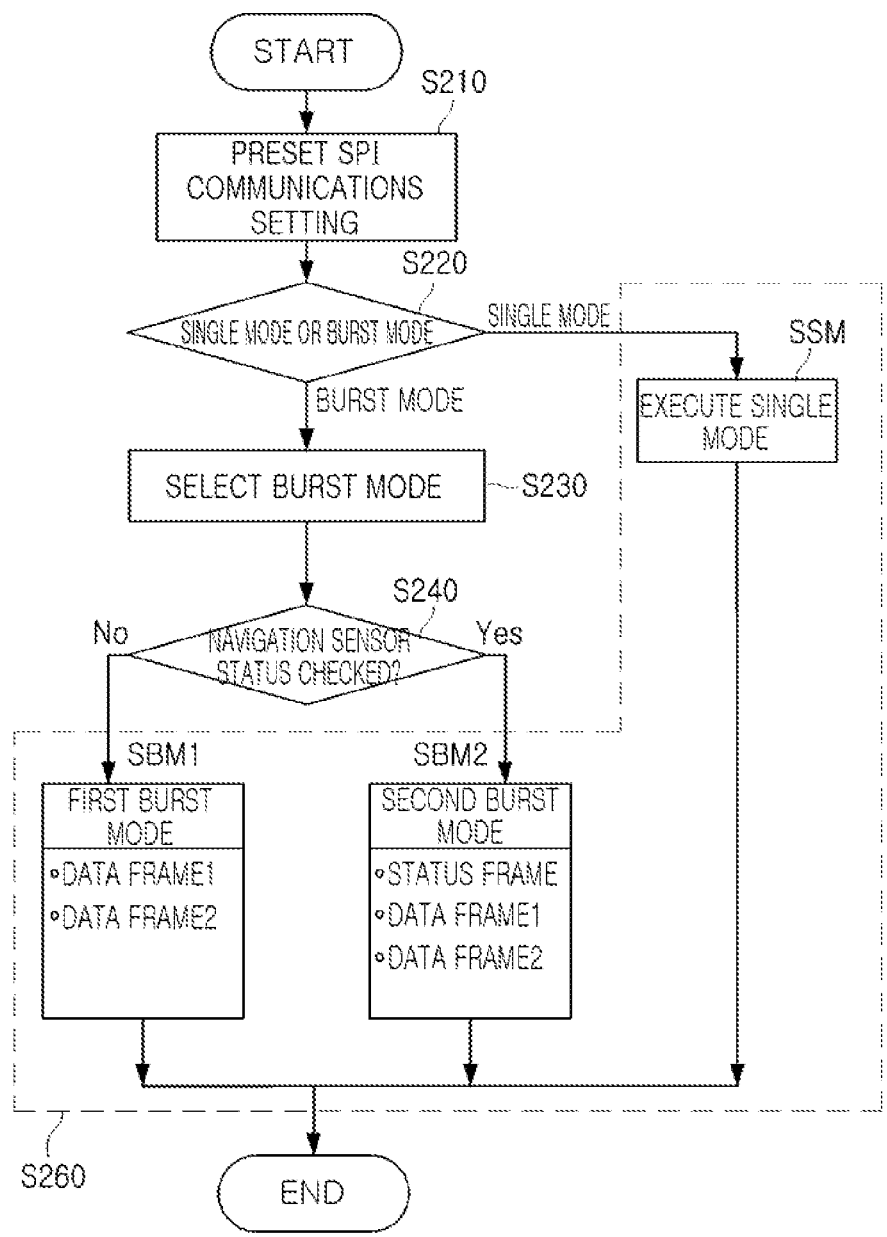
FIG. 3 is a flowchart of an example of a communications method of a camera apparatus.
Figure 4:
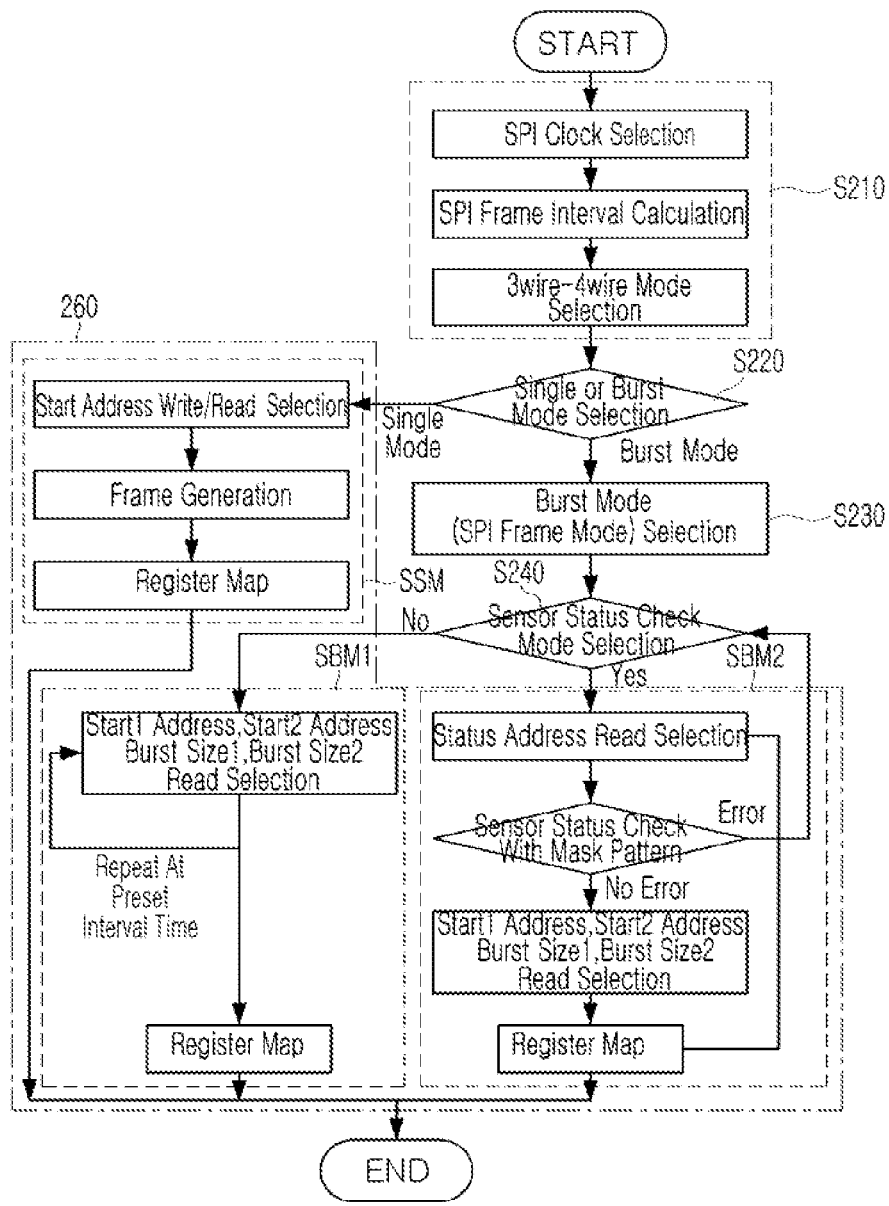
FIG. 4 is a detailed flowchart of the example of the communications method of the camera apparatus of FIG. 3.

In one example, the digital circuit 120 provides data from the navigation sensor 200 to the control circuit 110 using any one communications mode among a predetermined single mode, and a first burst mode SBM1 and a second burst mode SBM2 of a burst mode in response to control of the control circuit 110 (refer to FIGS. 3 and 4).

Figure 5:
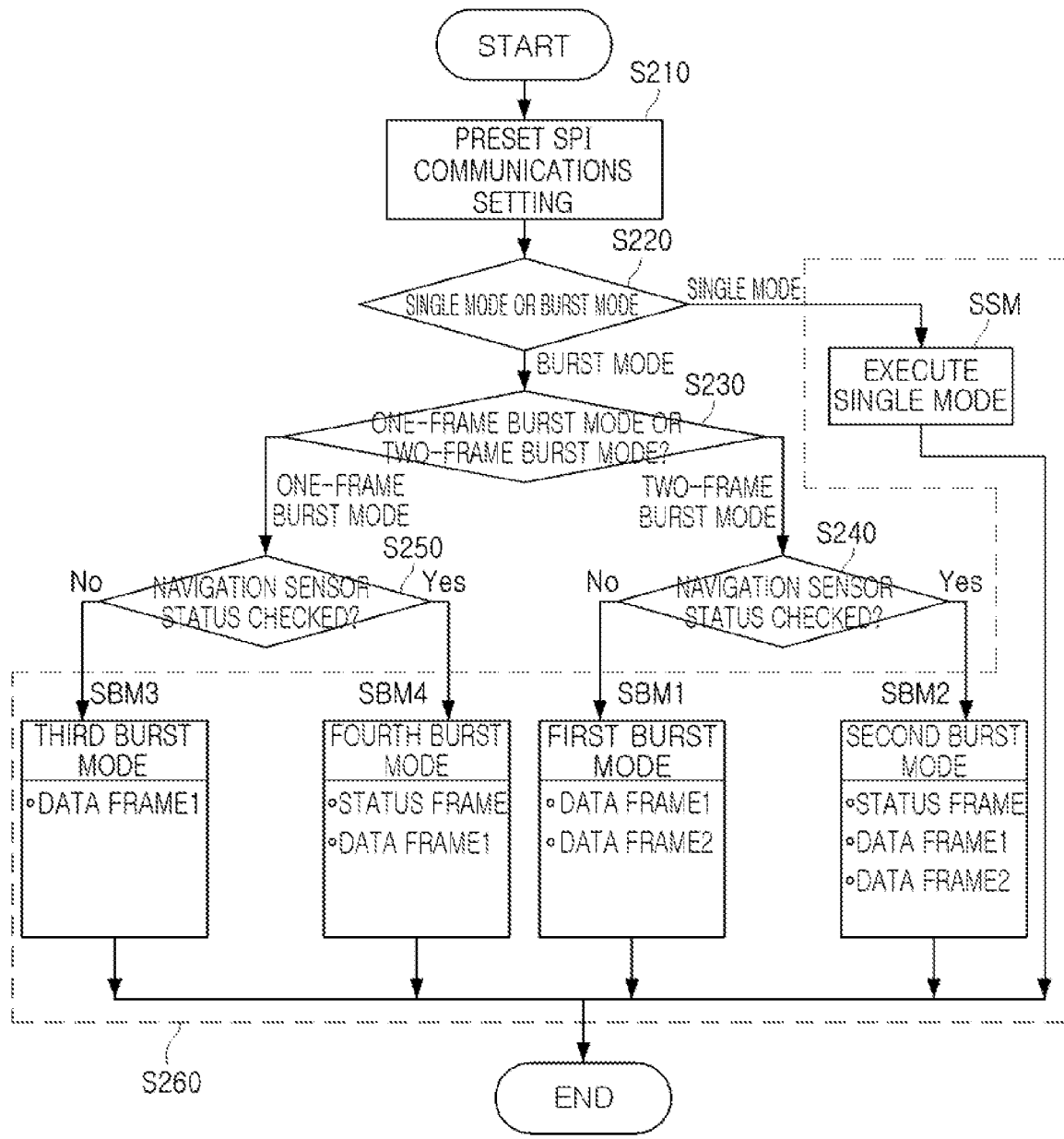
FIG. 5 is a flowchart showing another example of a communications method of a camera apparatus.
Figure 6:
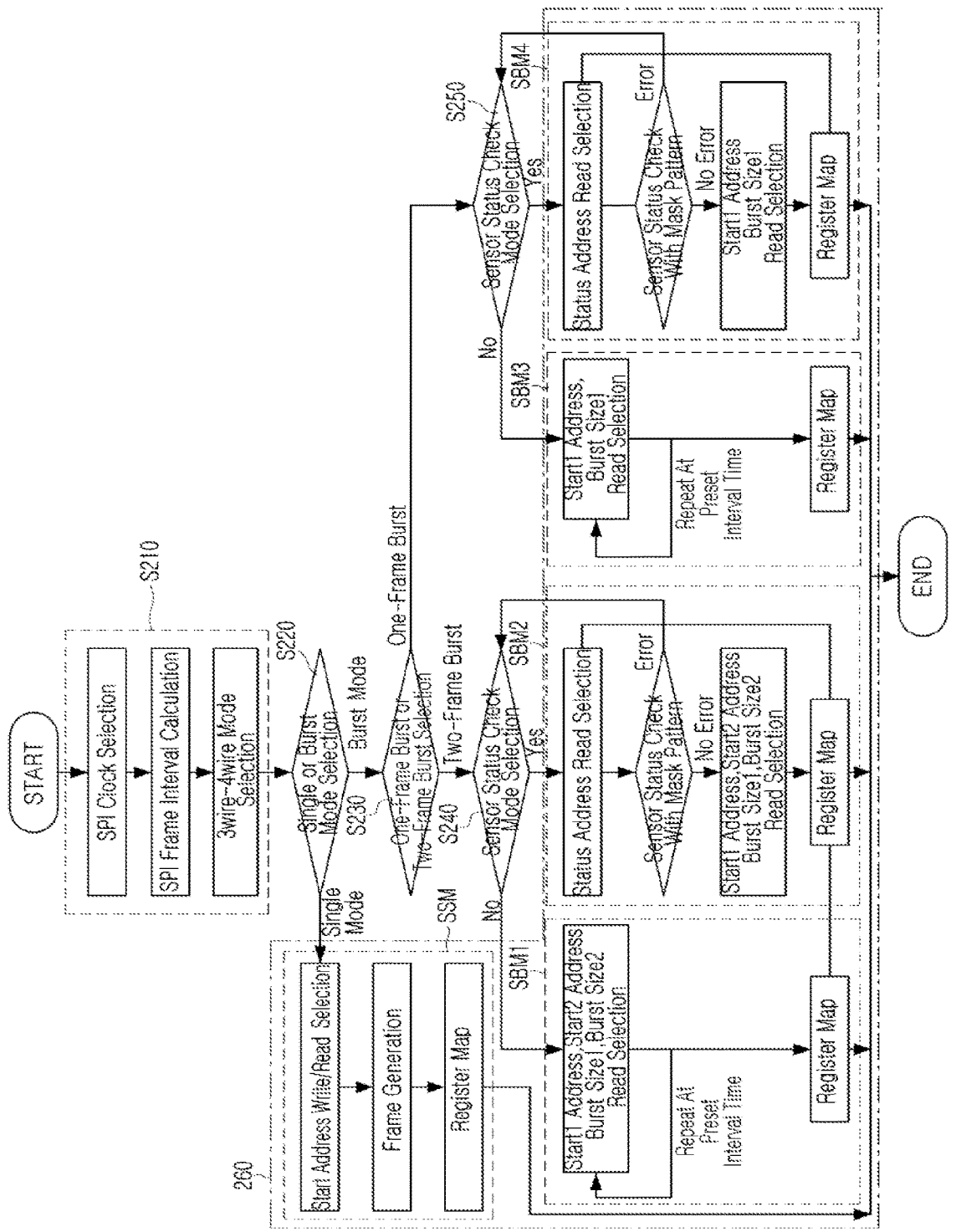
FIG. 6 is a detailed flowchart of the example of the communications method of the camera apparatus of FIG. 5.

In another example, the digital circuit 120 provides corresponding data from the navigation sensor 200 to the control circuit 110 using any one communications mode among a predetermined single mode, and the first burst mode SBM1, the second burst mode SBM2, a third burst mode SBM3, and a fourth burst mode SBM4 of the burst mode in response to control of the control circuit 110 (refer to FIGS. 5 and 6).

For example, the single mode may be a mode for processing 1-byte data. For example, the burst mode may include a two-frame burst mode for reading predetermined 2-byte data. As another example, the burst mode may include a two-frame burst mode and a one-frame burst mode for reading predetermined 2-byte data.

The two-frame burst mode includes the first burst mode SBM1 and the second burst mode SBM2 that use two data frames and are distinguished according to whether a status is checked. The one-frame burst mode includes the third burst mode SBM3 and the fourth burst mode SBM4 that use one data frame and are distinguished according to whether a status is checked.

For example, in the case of the two-frame burst mode included in the burst mode, the digital circuit 120 executes the two-frame burst mode to read two different types of data using two frames based on a single SRI communications setting from the navigation sensor 200.

With regard to the drawings, a repeated description of components having the same reference numeral and the same function is omitted if possible and only a difference in the drawings is described below.

Figure 2:
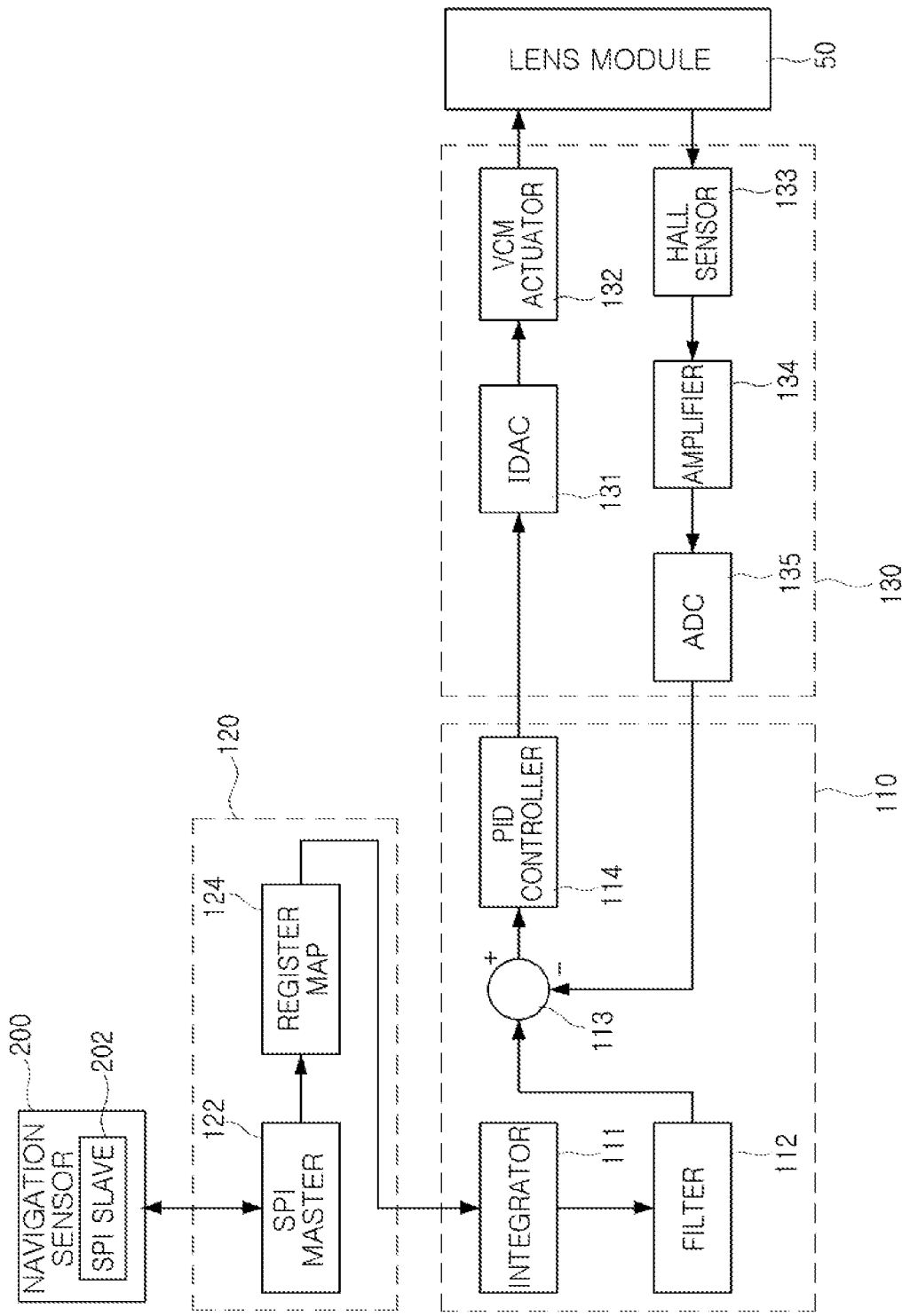
FIG. 2 is an internal block diagram showing an example of the camera apparatus of FIG. 1.

FIG. 2 is an internal block diagram showing an example of the camera apparatus of FIG. 1.

Referring to FIG. 2, in one example, the navigation sensor 200 includes a gyro sensor. In another example, the navigation sensor 200 includes a 3-axis gyro sensor and a 3-axis acceleration sensor.

The digital circuit 120 further includes a register map 124. The register map 124 stores data from the SPI master 122 and provides the stored data to the control circuit 110 in response to a request from the control circuit 110.

In one example, the control circuit 110 includes an integrator 111, a filter 112, a subtractor 113, and a proportional-integral-derivative (PID) controller 114.

The integrator 111 integrates data from the digital circuit 120 and provides the integrated data to the filter 112. The filter 112 filters data from the integrator 111 and provides the filtered data to the subtractor 113 as sensing data. The subtractor 113 subtracts detection data received from the analog circuit 130 from the sensing data from the filter 112 to obtain difference data, and provides the difference data to the PID controller 114. The PID controller 114 provides control data to the analog circuit 130 based on the difference data from the subtractor 113.

In one example, the analog circuit 130 a current digital-to-analog converter (IDAC) 131, a voice-coil motor (VCM) actuator 132, a Hall sensor 133, an amplifier 134, and an analog-to-digital converter (ADC) 134.

The IDAC 131 converts digital control data from the control circuit 110 into an analog control signal and provides the analog control signal to the VCM actuator 132. For example, the analog control signal may be a current signal. The VCM actuator 132 operates according to the analog control signal from the IDAC 131 to drive the lens module 50. The Hall sensor 133 detects a position of the lens module 50 and provides a detection signal to the amplifier 134. The amplifier 134 amplifies the detection signal from the Hall sensor 133 and provides the amplified detection signal to the ADC 134. The ADC 134 converts the amplified detection signal from the amplifier 134 into digital detection data and provides the digital detection data to the control circuit 110.

FIG. 3 is a flowchart of an example of a communications method of a camera apparatus. FIG. 4 is a detailed flowchart of the example of the communications method of the camera apparatus of FIG. 3.

Figure 7:
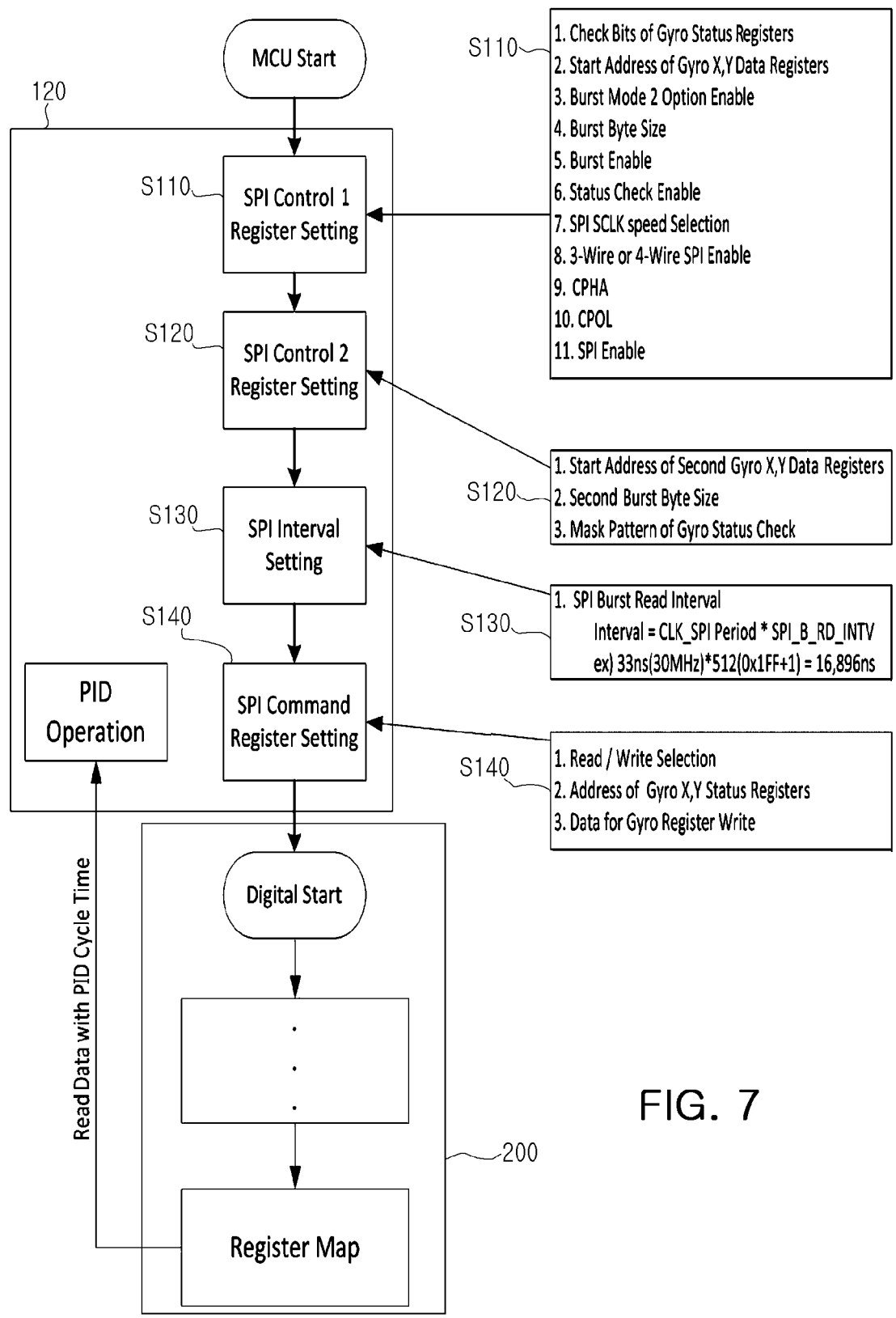
FIG. 7 is a flowchart showing an example of an SPI communications setting of a camera apparatus.

Referring to FIGS. 1 through 4, in the communications method of the camera apparatus illustrated in FIGS. 3 and 4, the control circuit 110 of the OIS circuit 100 of the camera apparatus shown in FIG. 1 presets an SPI communications setting (refer to FIG. 7).

Then, the control circuit 110 of the OIS circuit 100 determines a communications mode of data to be processed and commands the digital circuit 120 to process data using the determined communications mode.

Then, the digital circuit 120 performs SPI communications with the navigation sensor 200 to write corresponding data to the navigation sensor 200 or to read corresponding data from the navigation sensor 200 in response to the command of the control circuit 110.

The communications method of the camera apparatus will now be described with reference to FIGS. 3 and 4. First, to preset an SPI communications setting for initiating SPI communications, an SPI clock selection, an SPI frame interval calculation, and a 3 wire-4 wire mode selection are performed (S210).

Then, whether a communications mode of data to be currently processed is a single mode or a burst mode is determined (S220). A data processing procedure may be either one or both of a data reading operation and a data writing operation.

Then, in the case of a burst mode, a communications mode of data to be currently read or written is determined among a first burst mode SBM1 and a second burst mode SBM2 included in a preset two-frame burst mode (S230).

Then, in the case of the two-frame burst mode, whether a current mode is a sensor status check mode is determined based on the preset SPI communications setting (S240), and according to the determination result, the digital circuit 120 executes a two-frame burst mode of SPI communications with the navigation sensor 200, reads data using two frames based on a single SRI communications setting from the navigation sensor 200, and stores the data in a register map (SBM1 and SBM2).

For example, in the case of the first burst mode SBM1, data is read and stored in a register map using data frame 1 (burst size 1) from start 1 address and data frame 2 (burst size 2) from start 2 address without a sensor status check repeatedly at a preset interval time.

In the case of the second burst mode SBM2, a status address read is selected, when a sensor status is checked using a mask pattern and an error occurs, the method returns to a previous operation, and when a sensor status is checked and an error does not occur, data is read using data frame 1 (burst size 1) from start 1 address and data frame 2 (burst size 2) from start 2 address.

In the case of the single mode, the digital circuit 120 executes the single mode of SRI communications with the navigation sensor 200 based on the preset SRI communications setting to read data using one frame generated based on a single SRI communications setting from the navigation sensor 200 and store the data in a register map (SSM). For example, a start address write/read is selected, a frame is generated, and read data is stored in a register map.

FIG. 5 is a flowchart showing another example of a communications method of a camera apparatus. FIG. 6 is a detailed flowchart of the example of the communications method of the camera apparatus of FIG. 5.

Referring to FIGS. 1, 2, 5, and 6, in the communications method of the camera apparatus illustrated in FIGS. 5 and 6, the control circuit 110 of the OIS circuit 100 of the camera apparatus shown in FIG. 1 presets an SRI communications setting (refer to FIG. 7).

Then, the control circuit 110 of the OIS circuit 100 determines a communications mode of data to be processed and commands the digital circuit 120 to process data using the determined communications mode.

Then, the digital circuit 120 performs SRI communications with the navigation sensor 200 to write corresponding data to the navigation sensor 200 or read corresponding data from the navigation sensor 200 in response to the command of the control circuit 110.

The communications method of the camera apparatus will now described with reference to FIGS. 5 and 6. First, to preset an SPI communications setting for initiating SPI communications, an SPI clock selection, an SPI frame interval calculation, and a 3 wire-4 wire mode selection are performed (S210).

Then, whether a communications mode of data to be currently processed is a single mode or a burst mode is determined (S220). A data processing procedure may be either one or both of a data reading operation and a data writing operation.

Then, in the case of a burst mode, a communications mode of data to be currently read is determined among the first burst mode and the second burst mode included in the preset two-frame burst mode, and the third burst mode and the fourth burst mode included in the one-frame burst mode (S230 to S250).

Then, in the case of the two-frame burst mode, the digital circuit 120 executes the two-frame burst mode of SPI communications with the navigation sensor 200 based on the predetermined SPI communications setting to read data using two frames using a single SPI communications setting from the navigation sensor 200 and store the data in a register map (SBM1 to SBM4).

For example, in the case of the first burst mode SBM1, data is read and stored in a register map using data frame 1 (burst size 1) from start 1 address and data frame 2 (burst size 2) from start 2 address without a sensor status check repeatedly at a preset interval time.

In the case of the second burst mode SBM2, a status address read is selected, when a sensor status is checked using a mask pattern and an error occurs, the method returns to a previous operation, and when a sensor status is checked and an error does not occur, data is read using data frame 1 (burst size 1) from start 1 address and data frame 2 (burst size 2) from start 2 address.

In the case of the third burst mode SBM3, data is read using data frame 1 (burst size 1) from start 1 address without a sensor status check and stored in a register map repeatedly at a preset interval time.

In the case of the fourth burst mode (SBM4), a status address read is selected, when a sensor status is checked using a mask pattern and an error occurs, the method returns to a previous operation, and when a sensor status is checked and an error does not occur, data is read using data frame 1 (burst size 1) from start 1 address.

In the case of the single mode, the digital circuit 120 executes the single mode of SPI communications with the navigation sensor 200 based on the preset SPI communications setting to read data using one frame generated based on a single SPI communications setting from the navigation sensor 200 and store the data in a register map (SSM). For example, a start address write/read is selected, a frame is generated, and read data is stored in a register map.

FIG. 7 is a flowchart showing an example of an SPI communications setting of a camera apparatus.

Referring to FIG. 7, to operate the SPI master 122 of the digital circuit 120, the control circuit 110 of the OIS circuit 100 of the camera apparatus presets a register setting for SPI communications as follows.

First, as a first register setting procedure, an SPI control 1 register setting is performed for SPI communications and data frame 1 (DF1) (S110).

For example, as shown in FIG. 7, the setting for SPI communications and data frame 1 (DF1) includes the following information. 1. Check Bits of Gyro Status Registers—bit setting for selecting and using only a required bit in a gyro status register, 2. Start Address of First Gyro X, Y Data Registers, 3. Burst Mode 2 Option Enable—setting for selection of one/two frames when an SPI frame is generated, 4. Burst Byte Size—first burst frame data size, 5. Burst Enable—single/burst mode selection, 6. Status Check Enable—setting indicating whether a frame for checking a status is transmitted during transmission of an SPI frame, 7. SPI SCLK Speed Selection, 8. 3-wire or 4-wire SPI Enable—determine the number of communication lines to be used in SPI communications, 9. Clock Phase (CPHA), 10. Clock Polarity (CPOL), and 11. SPI Enable. The above 9. Clock Phase (CPHA) and 10. Clock Polarity (CPOL) signals are signals used to determine an edge of a clock signal that is transmitted from an SPI master and is sampled.

Then, as a second register setting procedure, an SPI control 2 register setting and status check mask pattern are defined with respect to data frame 2 (DF2) (S120).

For example, as shown in FIG. 7, setting of data frame 2 (DF2) includes the following information. 1. Start Address of Second Gyro X, Y Data Registers—second frame start address, 2. Second Burst Byte Size, 3. Mask Pattern of Gyro Status Check—this is used in association with the aforementioned Check Bits of Gyro Status Registers. The mask pattern is needed to remove an error that may occur when all values of a gyro status register inside a digital circuit are compared.

Then, as a third register setting procedure, an SPI interval setting is performed (S130).

For example, as shown in FIG. 7, the SPI burst read interval is determined by the product CLK_SPI Period*SPI_B_RD_INTV of an SPI clock period (CLK_SPI Period) and SPI burst read interval data (SPI_B_RD_INTV). For example, when the SPI clock period is 33 ns (e.g., a clock frequency is 30 MHz) and the burst read interval data (SPI_B_RD_INTV) is 512 (0x1FF+1), the SPI burst read interval is 16,896 ns (33 ns*512).

Then, as a fourth register setting procedure, an SPI command register setting is performed (S140).

For example, as shown in FIG. 7, the SPI command register setting includes the following information. 1. Read/Write Selection, 2. Address of Gyro X, Y Status Registers—status registers of gyro X and Y data, and 3. Data for Gyro Register Write. This may be a setting for issuing a command to generate a frame from the SPI master 122 of the digital circuit 120 by the control circuit 110.

Through the above procedure, the control circuit 110 of the OIS circuit 100 defines four registers for SPI communications and the control circuit 110 presets a register map of the digital circuit 120. Through the register setting procedure, preparation for reading corresponding data from a register map of the navigation sensor 200 is performed.

Although FIG. 7 illustrates an example in which the navigation sensor is a gyro sensor, the navigation sensor is not limited thereto. Also, the detailed information of each setting is not limited thereto, but is merely an example.

Figure 8:
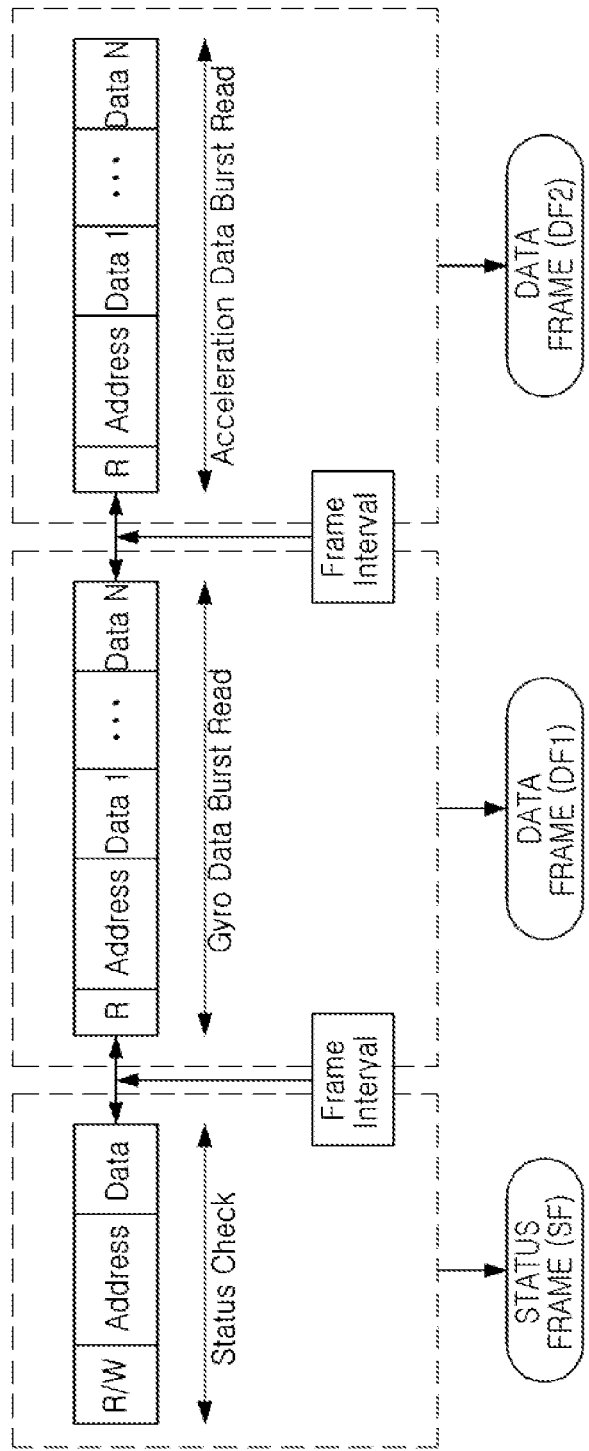
FIG. 8 is a diagram showing an example of structures of frames used in the communications methods of FIGS. 3 through 6.

FIG. 8 is a diagram showing an example of structures of frames used in the communications methods of FIGS. 3 through 6.

Referring to FIG. 8, a status frame (SF) includes a read/write identifying region (R/W), an address region (Address), and a data region (Data).

A data frame 1 (DF1) includes a read identifying region (R), an address region (Address), and a plurality of data regions (Data 1 to Data N) for reading gyro data from the navigation sensor.

A data frame 2 (DF2) includes a read identifying region (R), an address region (Address), and a plurality of data regions (Data 1 to Data N) for reading acceleration data from the navigation sensor.

Figure 9:
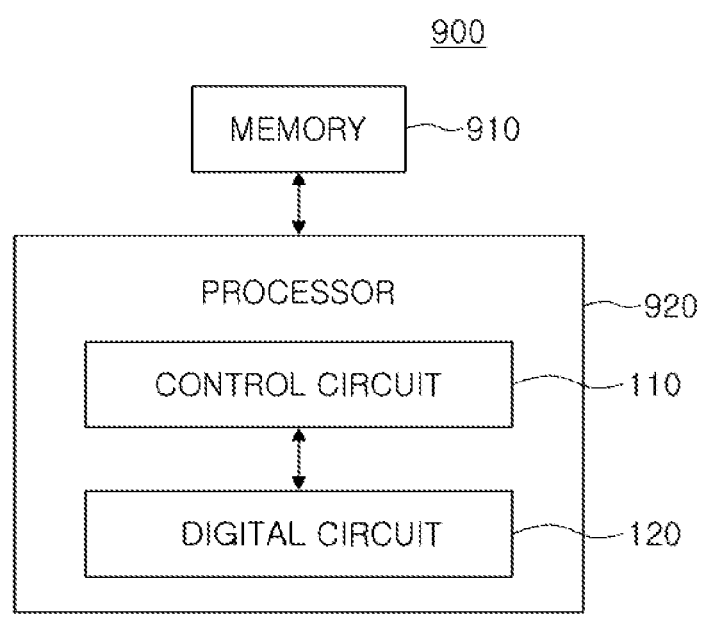
FIG. 9 is a block diagram illustrating an example of a controller implementing the control circuit and the digital circuit of FIGS. 1 and 2.

FIG. 9 is a block diagram illustrating an example of a controller implementing the control circuit and the digital circuit of FIGS. 1 and 2.

Referring to FIG. 9, a controller 900 includes a memory 910 and a processor 920. The memory 910 stores instructions that, when executed by the processor 920, cause the processor 920 to perform the functions of the control circuit 110 and the digital circuit 120 of FIGS. 1 and 2. Thus, the processor 920 includes the control circuit 110 and the digital circuit 120.

Referring to FIGS. 5 and 6, the control circuit 110 reads data without a status check in the single mode (SSM) (SBM1). For example, in the single mode (SSM), start address and write/read selection and frame generation are performed, and read/write is performed on a register map.

The control circuit 110 reads data using data frame 1 (DF1) without a status check in the third burst mode SBM3 of the one-frame burst mode. For example, in the third burst mode SBM3, a start address, a burst size, and read are selected, and a read is repeatedly performed on a register map at a preset interval time.

The control circuit 110 reads data using a status frame (SF) and data frame 1 (DF1) for a status check in the fourth burst mode SBM4 of the one-frame burst mode. For example, in the fourth burst mode SBM4, a start address and read are selected, and when a gyro status check with a mask pattern is performed and an error does not occur, a start address, a burst size, and read are selected, and read is performed on a register map.

The control circuit 110 reads data using data frame 1 (DF1) and data frame 2 (DF2) without a status check in the first burst mode SBM1 of the two-frame burst mode. For example, in the first burst mode SBM1, start 1 address, start 2 address, burst 1 size, burst 2 size, and read are selected, and read is repeatedly performed on a register map at a preset interval time.

The control circuit 110 reads data using a status frame (SF), data frame 1 (DF1), and data frame 2 (DF2) for a status check in the second burst mode SBM2 of the two-frame burst mode. For example, in the second burst mode SBM1, a status address and read are selected, and when a gyro status check with a mask pattern is performed and an error does not occur, start 1 address, start 2 address, burst 1 size, burst 2 size, and read are selected, and read is performed on a register map.

In the examples described above, each of the control circuit 110 and the digital circuit 120 of the camera apparatus may be embodied in a computing environment in which a processor (e.g., any one or any combination of any two or more of a central processing unit (CPU), a graphics processing unit (GPU), a microprocessor, an application-specific integrated circuit (ASIC), and a field-programmable gate array (FPGA)), a memory (e.g., either one or both of a volatile memory (e.g., RAM) and a non-volatile memory (e.g., either one or both of ROM and a flash memory), an input device (e.g., any one or any combination of any two or more of a keyboard, a mouse, a pen, a voice input device, a touch input device, an infrared ray camera, and a video input device), an output device (e.g., any one or any combination of any two or more of a display, a speaker, and a printer) and a communication interface unit (e.g., any one or any combination of any two or more of a MODEM, a network interface card (NIC), an integrated network interface, a wireless frequency transmitter/receiver, an infrared port, and a USB interface unit) are connected to each other (e.g., via any one or any combination of any two or more of a peripheral component interface (PCI), a USB connection, a FireWire (IEEE 1394) connection, an optical bus configuration, and a network).

The computing environment may be embodied in a distributed computing environment or the like including a personal computer, a server computer, a handheld or laptop device, a mobile device (mobile phone, PDA, and media player), a multiprocessor system, a consumer electronic device, a minicomputer, a main frame computer, or the arbitrary aforementioned system or device, but is not limited thereto.

In the examples described above, the number of access times needed to read data from a navigation sensor such as a gyro sensor may be reduced by using a new frame structure of an SRI master, thereby enhancing a data processing speed.

That is, to effectively read data about acceleration and angular velocity from a navigation sensor using a new frame structure of an SRI master for an effective SRI master operation, a procedure of collecting data from a navigation sensor is simplified so that waste in a time resource is reduced to enhance a data processing speed and stably perform a proportional-integral-derivative (PID) operation in an MCU, thereby implementing as stable an OIS system as possible.

The control circuit 110, the digital circuit 120, the SRI master 122, and the SRI slave 202 in FIG. 1 and the control circuit 110, the integrator 111, the filter 112, the subtractor 113, the PID controller 114, the digital circuit 120, the SRI master 122, the register map 124, and the SRI slave 202 in FIG. 2 that perform the operations described in this application are implemented by hardware components configured to perform the operations described in this application that are performed by the hardware components. Alternatively, the SRI master and the SRI slave 202 in FIGS. 1 and 2 may be implemented by dedicated hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera apparatus comprising:
   an optical image stabilizer (OIS) circuit comprising:
      a control circuit configured to control data reading, and
      a digital circuit comprising a serial peripheral interface bus (SPI) master and configured to perform data processing using SPI communications in response to control of the control circuit to perform hand-shake correction; and
   a navigation sensor comprising an SPI slave for communication with the SPI master and configured to provide corresponding data in response to a request from the OIS circuit,
   wherein the control circuit is further configured to control communication using a single mode or a burst mode based on a preset SPI communications setting, and
   the digital circuit is further configured to read data from the navigation sensor using two frames based on a single SPI communications setting in a case of using the burst mode.

2. The camera apparatus of claim 1, wherein the digital circuit is further configured to determine a preset mode from a two-frame burst mode and a one-frame burst mode included in the burst mode, and in response to the two-frame burst mode being determined, execute the two-frame burst mode and the read data using the two frames from the navigation sensor based on the single SPI communications setting.

3. The camera apparatus of claim 1, wherein the single mode is set to a mode for processing 1-byte data, the burst mode comprises a one-frame burst mode and a two-frame burst mode for reading preset 2-byte data, the two-frame burst mode is configured to use two data frames, and comprises a first burst mode and a second burst mode distinguished according to whether a status is checked, and the one-frame burst mode is configured to use one data frame, and comprises a third burst mode and a fourth burst mode distinguished according to whether a status is checked.

4. The camera apparatus of claim 3, wherein the control circuit is further configured to control SPI communications between the digital circuit and the navigation sensor based on the preset SPI communications setting, and the digital circuit is further configured to perform corresponding data processing on the navigation sensor using any one communications mode of the preset single mode, the first burst mode, the second burst mode, the third burst mode, and the fourth burst mode in response to control of the control circuit.

5. The camera apparatus of claim 4, wherein the control circuit is further configured to:
   read the data using a data frame 1 and a data frame 2 in the first burst mode of the two-frame burst mode without a status check;
   read the data using a status frame for a status check, the data frame 1, and the data frame 2 in the second burst mode of the two-frame burst mode;
   read the data using the data frame 1 in the third burst mode of the one-frame burst mode without a status check; and
   read the data using the status frame for the status check and the data frame 1 in the fourth burst mode of the one-frame burst mode.

6. The camera apparatus of claim 5, wherein the status frame comprises a read/write identifying region, an address region, and a data region.

7. The camera apparatus of claim 5, wherein the data frame 1 comprises a read identifying region, an address region, and a plurality of data regions for reading gyro data from the navigation sensor.

8. The camera apparatus of claim 5, wherein the data frame 2 comprises a read identifying region, an address region, and a plurality of data regions for reading acceleration data from the navigation sensor.

9. A communications method of a camera apparatus, the camera apparatus comprising an optical image stabilizer (OIS) circuit, the OIS circuit comprising a control circuit and a digital circuit comprising a serial peripheral interface bus (SPI) master, the camera apparatus further comprising a navigation sensor comprising an SPI slave for SPI communications with the SPI master, the method comprising:
   determining whether a communications mode of data to be currently read is a single mode or a burst mode;
   in response to the determined communications mode being the burst mode, determining the communications mode of the data to be currently read to be a preset two-frame burst mode or a one-frame burst mode; and
   in response to the determined communications mode being the preset two-frame burst mode, executing the preset two-frame burst mode by the digital circuit to perform SPI communications with the navigation sensor based on a preset SPI communications setting and reading the data using two frames from the navigation sensor based on a single SPI communications setting.

10. The method of claim 9, wherein the determining of the communications mode of the data to be currently read to be the preset two-frame burst mode or the one-frame burst mode comprises determining the communications mode of the data to be currently read to be a first burst mode or a second burst mode included in the preset two-frame burst mode, or a third burst mode or a fourth burst mode included in the one-frame burst mode.

11. The method of claim 10, wherein the reading of the data comprises:
    reading the data using a data frame 1 and a data frame 2 in the first burst mode of the two-frame burst mode without a status check;
    reading the data using a status frame for a status check, the data frame 1, and the data frame 2 in the second burst mode of the two-frame burst mode;
    reading the data using the data frame 1 in the third burst mode of the one-frame burst mode without a status check; and
    reading the data using the status frame for the status check and the data frame 1 in the fourth burst mode of the one-frame burst mode.

12. The method of claim 11, wherein the status frame comprises a read/write identifying region, an address region, and a data region.

13. The method of claim 11, wherein the data frame 1 comprises a read identifying region, an address region, and a plurality of data regions for reading gyro data from the navigation sensor.

14. The method of claim 11, wherein the data frame 2 comprises a read identifying region, an address region, and a plurality of data regions for reading acceleration data from the navigation sensor.

* * * * *